Sept. 19, 1950 C. P. BENJAMIN 2,522,772
CONTAINER
Filed March 18, 1947 2 Sheets-Sheet 1
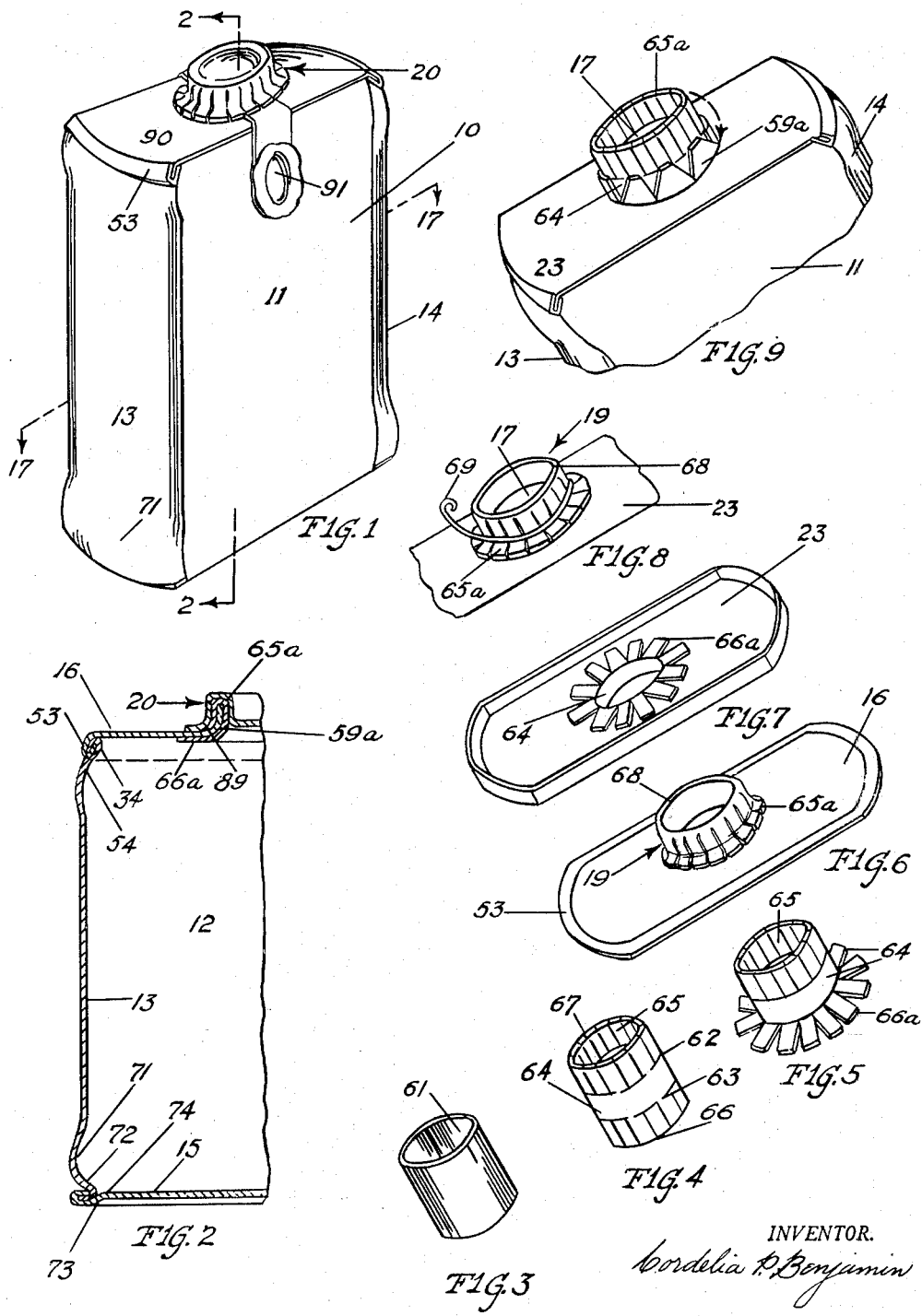
INVENTOR.
Cordelia P. Benjamin Sept. 19, 1950  C. P. BENJAMIN  2,522,772
CONTAINER
Filed March 18, 1947  2 Sheets-Sheet 2
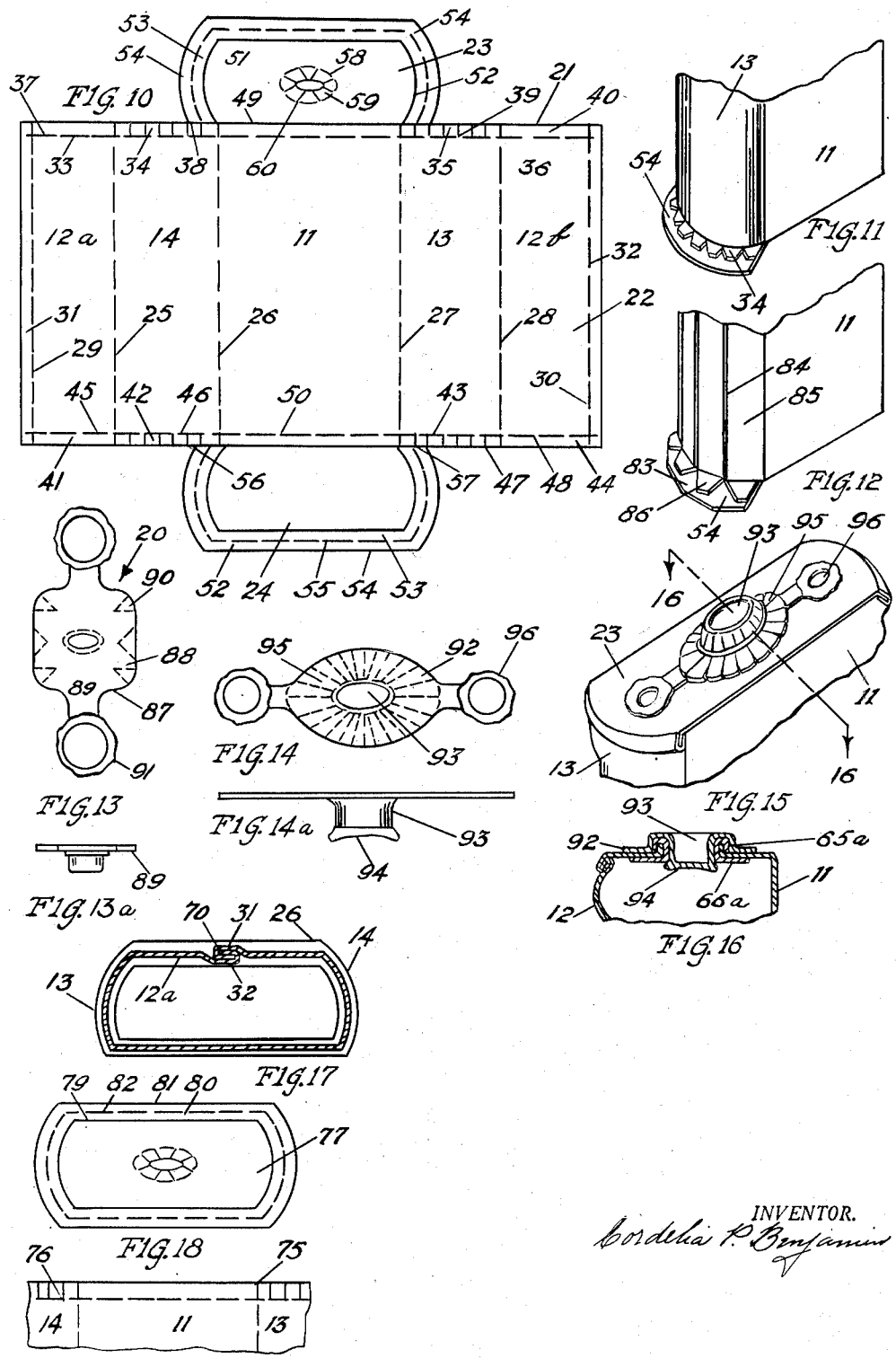
INVENTOR.
Cordelia P. Benjamin Patented Sept. 19, 1950

2,522,772

UNITED STATES PATENT OFFICE 2,522,772

CONTAINER

Cordelia P. Benjamin, Toledo, Ohio

Application March 18, 1947, Serial No. 735,377

4 Claims. (Cl. 285—49)

This invention relates to containers and their manufacture and more particularly to discardable containers for packaging and dispensing fluids and drinkable liquids.

It has been the accepted practice to package and dispense many fluids and drinkable liquids in glass bottles, but for various reasons there are many objections to the use of glass bottles for this purpose. To enumerate a few, suitable glass containers are fabricated with extra heavy glass walls to provide for adequate structural strength with the result that the overall weight of the container is excessive. This is important when considering the costs of transporting the packaged materials and returning the emptied containers for refilling. Even with these heavy walls, there is ever present the danger of the loss of the container and their contents due to breakage. Such breakage, not infrequently, results in injuries not only to the handler, but also to other nearby persons. Furthermore, the emptied glass container presents a disposal problem for the glass bodies are inert and cannot readily be disposed.

Aside from the disadvantages of the heavy glass in the containers, further objections to the use of glass bottles in the packaging of drinkable liquids comprises the necessity of washing and sterilizing the new or returned bottles prior to filling with the drinkable liquids. Of further importance is the difficulty of labeling and printing on glass surfaces as well as the relatively high costs of the bottle even considering that it can be reused several times.

It is an object of this invention to produce a container for liquids which avoids the undesirable features of glass bottles in that the container is a sanitary one-trip container which is light in weight, shatter proof, provides a markable surface and is formed of easily destructible or combustible materials.

Another object is to produce a container which is simply and economically manufactured of light weight and pliable sheet materials and, in the manufacture, is formed with the desired structural strength and rigidity to resist the forces incident to normal handling and the desired imperviousness for packing liquids for shipment.

In practicing the invention, I propose to fabricate the container almost entirely of sheet stock, which may be taken to include fibrous fabrics, textiles materials, and sheets of paper. These may be treated on one or both sides before or after the sheet stock has been fabricated into a container with a non-toxic, odorless and tasteless material which is capable of imparting imperviousness to the container walls. Suitable treating materials include the various microcrystalline or amorphous waxes, oils and synthetic resinous materials and dopes such as those formed of the vinyl family of resins, polystyrene, phenolic and nitrogenous resin forming materials with aldehydes, alkyds, acrylic esters, polyamides, polyesters and the like. The term sheet stock may also be taken to include sheets of plastic or laminates which in themselves may have the properties of strength and resistance to the passage of moisture or gasses through the walls, in which case, additional coatings or treatments are unnecessary.

Many persons have considered the construction and use of a fibrous container, but in the main, these containers have been fabricated in the form of cartons. In this sense, the carton operates merely to contain the fluid during shipment, and, when it has reached its destination, the content fluid is generally poured into another drinking receptacle, or else, a straw or the like is inserted through an opening for withdrawing the liquid. There are numerous occasions wherein a cup or a glass cannot readily be made available, or other instances wherein the consumer dislikes the use of straws and prefers to be able to drink the contents directly from the container.

Therefore, it is a further object of this invention to produce a new and improved fibrous container in which an ordinary portion of drinkable fluid may be packaged and dispensed and, if desired, consumed directly from the container without resorting to the use of other bodies.

A still further object is to produce of fibrous or plastic sheet material, a simple and attractive container in the form of a flask which is adapted comfortably to fit the hand and with a mouthpiece adapted comfortably to fit the mouth when used for drinking purposes. Cooperating with the mouthpiece there is provided a readily applied cap member for protecting the contents and the mouthpiece from contamination or leakage.

A still further object is to produce a new and improved mouthpiece which is sealed into the open end of a fluid container which is, as a result, then capable of being used advantageously either for pour out, or drinking purposes.

A still further object is to produce a method for simply and economically producing without material waste, a one-trip container of resilient and light weight fibrous materials, which container may be used for dispersing palatable liquids and can be used in the nature of a flask.

Other objects and advantages of this invention will hereinafter appear, and for purposes of illustration but not of limitation, various embodiments of the invention are shown in the accompanying drawings in which, Figure 1 is a perspective elevational view of a container constructed in accordance with the present invention;

Figure 2 is a sectional elevational view of a fragment of the container taken along the line 2—2 of Figure 1;

Figures 3, 4, 5, 6, 7, and 8 are perspective views which illustrate a method of forming a separate mouth piece and assembling it as part of the top closure of the container;

Figure 9 is a fragmentary perspective view of the upper end portion of the container showing the relative position of parts when the mouth piece is first inserted through the closure opening;

Figure 10 is a detailed plan view of a blank capable of being fabricated into a container;

Figures 11 and 12 are fragmentary elevational views which illustrate other shapes in which the side walls of the container may be formed;

Figure 13 is a top view of a sealing cap member;

Figure 13A is an end elevational view of the cap member shown in Figure 13;

Figure 14 is a top plan view of another form of cap member;

Figure 14A is an end view of the cap member shown in Figure 14;

Figure 15 is a fragmentary perspective view of the cap member of Figure 14 in position of use on the container;

Figure 16 is a sectional elevational view taken along the line 16—16 of Figure 15;

Figure 17 is a sectional view taken along the lines 17—17 of Figure 1;

Figure 18 is a fragmentary view of a blank with the closure member formed separately of the strip.

Although the container may be fabricated of various materials of almost any capacity ranging from one fluid ounce to one gallon, for purposes of clarity, the invention will be described with respect to a container having the capacity of 6 or 8 fluid ounces and is formed of previously waterproofed materials. A container of the type described may be used in packaging and dispensing a drinkable portion of milk or the like.

The concept of my invention is embodied in a container of the type illustrated in Figure 1 having a body portion 10 which may be any desired wall thickness and any shape in end elevation. The body portion is illustrated as being formed of separate parallel front and rear walls 11 and 12 integrally connected along their lateral edges by curvilinear side walls 13 and 14. While the container of the type illustrated is adapted comfortably to fit the hand, it is to be understood that the body portion 10 may equally be formed round, square, triangular, polygonal, cycloidal or of other geometric shapes. The side walls may also be formed of subdivisions in the form of multiple integral panels as illustrated in Figure 12 of the drawings. The bottom of the body portion is sealed by a closure 15 and at the top by another closure 16, which has an opening 17 in the center thereof. The opening may be formed round or of any other shape for receiving a similarly shaped mouthpiece, but for drinking purposes, I prefer to form the opening elliptical for receiving an elliptically shaped mouthpiece 19 adapted comfortably to fit to the mouth while drinking. The mouthpiece is adapted to be covered by a cap member 20 to prevent leakage of the contents and also to protect the contents and the mouthpiece from outside contamination.

In the essential elements described, the container may be in the form of a flask which when formed of impervious material, such as waterproofed paper, is capable of packaging liquids for use at distant stations where glass cups and other drinking aids are not readily available, or their use is inconvenient. In this instance the ingredients may be taken directly from the container and, when emptied, the container may be discarded and easily destroyed. Rigidity is imparted to the container in part by the materials of construction and in part by the reinforcement and stiffening resulting from the overlapping at the edges where the various panel sections are brought together in sealed relation during the manufacture.

The structure of my container may best be understood from a description of its manufacture. For this purpose, there is provided a blank 21 formed of sheet stock of the selected material. The blank comprises a substantially rectangular strip 22 having integral extending sections 23 and 24 which form the top and bottom closure 16 and 15 respectively. The strip 22 is subdivided laterally into sections by the parallel score lines 25, 26, 27 and 28 extending across the shorter dimension of the strip. When folded on these score lines, the strip is formed into the body portion 10 with the rear wall 12 being formed of the end sections 12a and 12b. Secured to the outer edges of each of the end sections 12a and 12b and along the score lines 29 and 30 respectively are sealing flaps 31 and 32 which are coextensive in length with the end sections. Other flaps 33, 34, 35 and 36 are secured to the upper edge portions of each of the sections 12a, 14, 13 and 12b respectively along the score lines 37, 38, 39 and 40, while flaps 41, 42, 43 and 44 are secured to the bottom edges of each of these sections along the score lines 45, 46, 47 and 48 respectively. The flaps 34, 35, 42, and 43, which are integral with the sections that later form the side walls 13 and 14, are split transversely into multiple substantially equal sections.

In this particular construction, the top and bottom closure sections 23 and 24 are integrally secured along the score lines 49 and 50 to the upper and lower edges respectively of the center section 11, which later forms the front wall of the container. Each closure consists of a central section 51 outlined by a score line 52 to conform to the shape of the container in end elevation. In this instance, the periphery of the section 51 is dimensionally equal to the end to end dimension of the strip 22 and the side edges are formed curvilinear and of a length corresponding with the width of the sections 13 and 14 respectively. Coextensive with the free marginal edges of the central section 51 are flaps 53 and 54 separated by score line 55. Cuts 56 and 57 are provided to separate the flaps 53 and 54 from the adjacent flaps 34 and 35, and 42 and 43 respectively which form a part of the main body portions of the blank or strip. Some of the subsequent assembly operations and the strength of the base portion of the container are enhanced if the bottom closure is indented from its coextensive flaps.

A scored ellipse 58 is formed in the central portion 51 of the top closure 23, and inward converging slits 59 connect the scored ellipse with a central cut out portion 60 defined by converging arcs which are in more or less parallelism with the elliptical scores. The slits 59 section the portion disposed between the opening 60 and the elliptical score, into multiple segments 59a.

The mouthpiece 19 which is adapted to form a part of the top closure, is formed of a separate element which may consist of the same materials making up the body portion or of other more rigid or related materials. The mouthpiece is formed of a tubular blank 61, which in end elevation assumes the contour of the elliptical score 58 when inserted therethrough. The blank 61 is subdivided by annular creases or score lines 62 and 63 into an intermediate band 64 and integral outer sections 65 and 66 which are formed into a plurality of outwardly extending fingers 65a and 66a by a series of equidistant parallel cuts 67 running lengthwise from each edge of the blank, and terminating at the respective score lines 62 and 63.

In fabricating the container, it is expedient first to assemble the mouthpiece in the top closure. For this purpose, the tubular member 61 is inserted from the underside through the opening 60 of the closure until the score 63 is adjacent to the elliptical score 58 of the closure. Unless the segments 59a are previously upturned, the insertion of the tubular member causes the segments to turn upwardly substantially perpendicular to the closure, and in abutting relation with the body portion 64 of the tubular member 61. The fingers 66a are feathered out against the under side of the closure 23, to which they are sealed by means of suitable adhesives. If the adhesives are of a thermoplastic nature and deposited on the outer walls of the fingers, or on the underside of the closure, adherence may be effected readily by means of a hot press. While in this position (Figure 11), the fingers 65a are folded outwardly and down in the direction of the arrow to encase the upstanding segments 59a, and are sealed to the outer walls thereof by means of a suitable adhesive. Thus, there is formed a mouthpiece 19 having a lip portion 68 elliptically shaped and reinforced by three thicknesses of material. As illustrated in Figure 8, instead of employing an adhesive for holding down the fingers 65a, a binding member in the form of a ribbon 69 or some other tape may be used. In this instance, the wire band 69 operates not only to hold down the fingers but also may be used to advantage in the mounting of a cap member, hereinafter to be described.

In forming the body portion 10, the strip 22 is folded along the score lines 25, 26, 27 and 28 bringing the flaps 31 and 32 into operative relation. Since one of the difficulties encountered in the construction of a fluid container resides in the fact that the seams are difficult to form leakproof, I have provided for an improved seam section in which the connecting portions are interlocked in a manner to resist the escape of the contained fluids and vapors. The seam 70 is formed by folding the flap 32 outwardly along the score line 30 and the flap 31 inwardly along the score line 29, hooking the flaps together to form a flat lock, and then sealing all of the abutting surfaces together throughout their length. Thus, at the seam 70, there is provided four thicknesses of material which are the width of the flaps 31 and 32 and in order for the liquid content material to escape, it must pass successively through each of these layers, which are sealed one to another with suitable adhesives. As the adhesive, I prefer to use a material having the characteristics of low diffusion, and is heat softenable, such as a thermoplastic resinous material or a wax; whereby the flat lock may be effected simply by heat pressing means.

The next step in the formation of the container is to secure the top and bottom closure to the body portion. Since the operations for effecting their assembly are substantially identical, it is considered sufficient merely to describe the assembly with respect to the bottom closure, it being understood that the steps for assembling the top follow the same pattern. Referring now to Figure 11 of the drawings, the flap 42 and the other flaps 41, 43 and 44 are folded outwardly at right angles from the body portion along the scored lines 45, 46, 47 and 48 respectively. Then the bottom closure 24 is turned at right angles along the score line 50 whereon the indented portion seats into the open end not only to close the open end, but effectively to position the body portion walls. In this position, the lower edges of the body portion 10 coincide with the score line 52 and the outturned flaps 41, 42, 43 and 44 are disposed in the area of the flap 53. The slit sections of the flaps 42 and 43 become separated as segments in view of the curvilinear nature of the side walls 13 and 14, it being understood that, if the side walls were formed straight, these cut out sections would be unnecessary, subdivision then only being required between the various flap sections to enable the desired folds. The outer flap 54 is then folded along the scored line 55 in the direction of the arrow and lapped and pleated over the segmented sections on each of the side walls 13 and 14 and the flap 41 and 44 on the front wall 12. The overlapping parts are adhered one to another by suitable sealing and adhering means. For purposes of affecting a fluid tight seal and to impart attractiveness and rigidity to the container, the lower portion of the body portion is press formed to provide a lower bulbous shaped portion 71 with a lower edge portion 72 inset to overlap the upturned flap 54 and provide for additional sealing area. Thus, as illustrated in Figure 2 of the drawings, the lower rim is now formed of four thicknesses of material, and in order to escape, the fluid must pass through the area of three widths of overlapping sections which are adhered together with such adhesives as will resist such fluid movements. In the sealing and forming, the waxy or thermoplastic materials used for effecting the seal, ordinarily flow sufficiently to conceal the crevices 73 between the converging flap sections, whereby leakage, as by capillarity or wicking is more difficult. If not previously indented, the bottom wall may be indented, as at 74 to provide further reinforcement and to offset the built up rim. The top closure is assembled in substantially the same manner, except that I prefer not to form an indention in the top closure for the reason that such reinforced area is unnecessary. The four thicknesses of material in the upper and lower rim obviously impart a stiffening which improves the rigidity and the appearance of the container for withstanding the forces of normal handling and to stand upright on its support.

Description has been made of a container formed of a simple blank having the top and bottom closure 23 and 24 attached. For various reasons, it might be desirable to form the top and bottom closure, or both, separate of the body portion. In case this is desired, the body portion of the blank is formed as a rectangular strip 22, which, in the main, is identical with the one previously described except, that, for the closure sections 23, a flap 75 is substituted. The flap 75 is secured to the central section 11 along the score line 76 and corresponds in width to the other adjacent flaps 42 and 43 from which it is separated by a slit co-extensive with the score lines 26 and 27. The closure section 77 is formed with a central portion 78 defined by a score line 79, which sets off the central portion from the co-extensive flaps 80 and 81 extending all around and divided by another score line 82.

When the top closure is formed separate, the mouthpiece 19 may be pre-assembled therein as previously described. The steps necessary to effect the assembly are substantially the same as that connected with the modification wherein the closures are attached. The only differences consist in turning the flap 75 with the others, and then positioning the folded body portion on the score line 79. In this position, the flap 81 extends beyond the flap 75 and is turned back upon the flaps 75 and 80. The overlapping and reinforcing rim now extends all around the bottom and/or the top.

If, as illustrated in Figure 12, it is preferred to form the side walls 13 and 14 polygonal, the slits 83 in the flap sections 34, 35, 42 and 43 lead from the creases 84 defining the panel 85 in the side walls. In the folding, the flaps separate into segments 86 to relieve the tension on the side walls and to provide receiving surfaces for the creased and pleated upturned sections 54 of the bottom and top closures.

The package is completed by the addition of a cap member 20. Although there are many types of caps that may be used for sealing off and protecting the mouth piece and the contents from contamination, I shall describe a few preferred modifications. One such cap is illustrated in Figures 13 and 13A of the drawings. This cap is formed of a cut out blank 87 which may be of the materials having the properties of the container walls. The blank is formed with a body section 88 and intermediate thereof an embossed elliptical portion 89 which is dimensionally similar to the mouthpiece in end elevation. The embossed portion 89 is capable of disposition in the mouthpiece in the assembled relation and with the upright section 64 forms a gripping seal all around. The remainder of the body portion is triangularly scored about its edges, as at 90, to facilitate pleating and lapping when pressed down and formed about the lip 68 of the mouthpiece. Tabs 91, having suitable adhesives on their underside, extend laterally beyond the top closure and when in the assembled position these are securable to the front and rear wall 11 and 12 respectively for holding the cap in place.

An even simpler modification of a cap is illustrated in Figures 14 and 14A of the drawings. In this form, the cap is provided with a central portion 92 and intermediate thereof an embossment 93 which dimensionally corresponds with the contour of the mouthpiece 19. The embossment 93 is formed of a depth which is greater than the vertical dimension of the mouthpiece by an amount forming a bulbous portion 94 in its lower end. The remainder of the central portion is scored and pleated 95 so as neatly to encase the lip portion of the mouthpiece. Adhesive tabs 96 are provided to hold the cap in place. This modification provides an improved seal for the reason that, after the container is filled with the required amount of liquid, the embossed portion may then be inserted into the open mouthpiece. On insertion, the bulbous portion 94 is deformed inwardly until it has passed beyond the lower end of the mouthpiece, whereupon it tends to return towards its normal position and tensionally holds the cap in place. If suitable materials having cold flow such as plasticized thermoplastic resinous materials or micro-crystalline waxes are provided on the upper surfaces of the bulbous portion or on the lower face of the mouthpiece, an air tight and fluid tight seal may be effected which seal obviously improves as the pressure inside the container builds up and presses one surface more strongly against the other. Thus, a cap of the type described appears suitable for containers used for dispensing carbonated beverages.

The preceding describes the unique features of a container formed of light weight and low cost materials into a fluid type package in which milk and other liquids may be dispersed for drinking purposes without requiring the use of other drinking implements. The container is readily assembled in a few simple operations from a blank, and without waste, other than the small cut out segment 60 defined by the converging arcs for receiving the mouthpiece 19 in gripping relation. If the material from which the container is manufactured does not have the characteristics of resistance to diffusion of moisture, liquids or gases in one direction or the other, the material first may be coated or impregnated on one or both sides with a suitable treating material or else, when fully constructed, the container may be coated with the treating material by suitable means such as by a spray, brushing, or by a dip process. For all practical purposes, it is desirable to coat the container with a material which is pleasant to feel and yet hard enough to resist removal or visual imprint and is of a character to resist the loss by diffusion or contamination of the contained liquids. If the treated material is able to resist the diffusion of gases, the container may be used for dispersing carbonated beverages or other gaseous fluids wherein the inner pressures are not so great as to deform or rupture the container walls. Thus a container of the type described has special advantage when used for dispersing liquids at crowded distant stations, such for example as at athletic events, conventions and the like wherein the disposal and handling of glass containers provides a serious problem and at such places as lunch counters, refreshment stands, planes and trains, just to mention a few. A container manufactured in the manner described is adapted comfortably to fit the hand, it is considered sanitary and germ proof for the reason that the container and area over which the contents is poured or brought in contact with the mouth are effectively protected, and the emptied container is discarded and never reused. Furthermore, the container is simple in construction, so as to be manufactured by low cost mass production methods, light in weight and sufficiently strong so as to enable normal handling in shipment and sale.

It is to be understood that numerous changes in the details of construction, assembly and design may be effected without departing from the spirit of the invention, especially as defined in the following claims.

I claim:

1. In a container having an opening in a wall thereof, a mouthpiece for the opening, said mouthpiece comprising a tubular body fitting the opening, integral tabs extending radially from the inner end of said body and secured to the inside of the container wall, said tubular body extending outside of the container, a plurality of tabs integral with the opposite end of the body and folded upon the outer surface of the body, and means for securing said last tabs to the body.

2. In a container having an opening in a wall thereof, a mouthpiece for the opening, said mouthpiece comprising a tubular body fitting the opening, integral tabs extending radially from the inner end of said body and secured to the inside of the container wall, said tubular body extending outside of the container, a plurality of tabs integral with the opposite end of the body and folded upon the outer surface of the body, said last tabs forming a peripheral row with adjacent tabs substantially in abutment, and adhesive means for securing said last tabs to the body.

3. In a container having an opening in a wall thereof, a mouthpiece for the opening, said mouthpiece comprising a tubular body elliptical in cross section fitting the opening, integral tabs extending radially from the inner end of said body and secured to the inside of the container wall, said tubular body extending outside of the container, a plurality of tabs integral with the opposite end of the body and folded upon the outer surface of the body terminating adjacent the container wall, said last tabs forming a peripheral row with adjacent tabs substantially in abutment, and adhesive means for securing said last tabs to the body.

4. In a container having an opening in a wall thereof and a row of upstanding segments struck from the wall and surrounding the opening, a mouthpiece for the opening, the mouthpiece comprising a tubular body fitting the opening and embraced by the upstanding segments, means integral with the body and projecting therefrom for securing the same to the inside of the container wall, a plurality of tabs forming a peripheral row with adjacent tabs substantially in abutment extending inwardly from the outer end of said body and overlapping said segments, and adhesive means securing said last tabs to said segments.

CORDELIA P. BENJAMIN.

REFERENCES CITED

The following references are of record in the file of this patent:

UNITED STATES PATENTS

| Number | Name | Date |
| --- | --- | --- |
| 1,216,391 | Allen | Feb. 20, 1917 |
| 1,803,239 | Deane | Apr. 28, 1931 |
| 1,889,134 | Schleicher | Nov. 29, 1932 |
| 1,967,931 | Fox | July 24, 1934 |
| 2,069,033 | Guenther | Jan. 26, 1937 |
| 2,286,342 | Calva | June 16, 1942 |
| 2,355,044 | Almgren | Aug. 8, 1944 |